(12) United States Patent
Muench

(10) Patent No.: US 10,093,825 B2
(45) Date of Patent: Oct. 9, 2018

(54) AQUEOUS TWO-COMPONENT COATING COMPOSITIONS AND HIGH EROSION RESISTANCE COATINGS PRODUCED THEREFROM

(71) Applicant: Akzo Nobel Coatings International B.V., Arnhem (NL)

(72) Inventor: Juergen Muench, Oldenburg (DE)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 15/306,287

(22) PCT Filed: Mar. 6, 2015

(86) PCT No.: PCT/EP2015/054722
§ 371 (c)(1),
(2) Date: Oct. 24, 2016

(87) PCT Pub. No.: WO2015/161952
PCT Pub. Date: Oct. 29, 2015

(65) Prior Publication Data
US 2017/0044397 A1    Feb. 16, 2017

(30) Foreign Application Priority Data

Apr. 24, 2014  (EP) .................... 14165726

(51) Int. Cl.
| | | |
|---|---|---|
| *C09D 167/04* | (2006.01) |
| *C08G 18/62* | (2006.01) |
| *C08G 18/10* | (2006.01) |
| *C08G 18/12* | (2006.01) |
| *C08G 18/40* | (2006.01) |
| *C08G 18/42* | (2006.01) |
| *C08G 18/44* | (2006.01) |

(52) U.S. Cl.
CPC ........... *C09D 167/04* (2013.01); *C08G 18/10* (2013.01); *C08G 18/12* (2013.01); *C08G 18/4063* (2013.01); *C08G 18/4277* (2013.01); *C08G 18/44* (2013.01); *C08G 18/6229* (2013.01); *C08G 18/6254* (2013.01)

(58) Field of Classification Search
CPC .................................................. C09D 167/04
USPC .......................................................... 524/507
See application file for complete search history.

(56) References Cited

U.S. PATENT DOCUMENTS

2013/0210997 A1    8/2013  Kaune et al.

FOREIGN PATENT DOCUMENTS

| CN | 101292001 A | 10/2008 |
| DE | 10 2010 044 935 A1 | 3/2012 |
| WO | 2007/033030 A2 | 3/2007 |
| WO | WO 2010/122157 A1 | 10/2010 |
| WO | WO 2012/032113 A1 | 3/2012 |

OTHER PUBLICATIONS

International Search Report and Written Opinion of the International Searching Authority dated May 7, 2015 in PCT/EP2015/054722.
International Preliminary Report on Patentability dated Oct. 25, 2016 in PCT/EP2015/054722 filed Mar. 6, 2015.

*Primary Examiner* — Deve E Valdez
(74) *Attorney, Agent, or Firm* — McDonnell Boehnen Hulbert & Berghoff LLP

(57) ABSTRACT

The present invention relates to an aqueous two-component coating composition comprising (1) an aqueous paint base component comprising (A) at least one aqueous dispersion of at least one polymeric resin and (B) at least one polycarbonate diol and also (2) a hardener component comprising (C) at least one polyisocyanate-modified polyester having an isocyanate content of 4% to 15%. The present invention also relates to a method for coating on substrates by applying the coating composition and also to the use thereof.

20 Claims, No Drawings

AQUEOUS TWO-COMPONENT COATING COMPOSITIONS AND HIGH EROSION RESISTANCE COATINGS PRODUCED THEREFROM

CROSS REFERENCE TO RELATED APPLICATION

This application is a National Stage entry under 35 USC 371 of PCT/EP2015/054722, filed on Mar. 6, 2015, and claims priority to European Patent Application No. 14165726.2, filed on Apr. 24, 2014.

The present invention relates to aqueous, two-component coating compositions and also to coatings produced from them. The present invention also relates to a method for producing these coatings and also to the use of the coating composition for producing coatings. The present invention relates not least to the use of the aqueous coating compositions for improving erosion resistance.

PRIOR ART

In various areas of application there is a requirement for coatings which satisfy exacting mechanical demands. Examples here include surfaces of objects that in terms of the ambient conditions are exposed to high speeds in conjunction with exposure to erosive substances, such as solids or liquids. Erosive exposure is experienced in principle, therefore, by objects which, firstly, themselves are moved, and, secondly, by objects exposed to the influence of erosive substances. Particularly noteworthy are rotor blades of wind turbines or helicopters and ship's screws, air and land vehicles (such as aircraft, rail vehicles, automobiles, for example), and ships.

Fundamentally, erosion can be brought about by liquid or solid substances which are present themselves or dispersely or in solution in another gaseous or liquid medium (for example, air or water) and which are moved by that medium (for example, airborne sands, rain and/or hail). When these substances strike objects or their surfaces, they exert an erosive force on them. Examples of this are the erosion due to rain or airborne sand on rotor blades or in the region of the slats on aircraft. The erosive influences are particularly strong in the region of edges of the objects in question.

In general terms the possibility exists of controlling wear protection, more particularly the erosion resistance, of objects by means of coatings on the surfaces of the objects. One possibility for increasing erosion resistance is to increase the film thicknesses of coatings. For reasons of weight, however, there are many applications where this is undesirable, such as in aircraft construction or rotor blade construction of wind turbines, for example.

Attempts are therefore made to provide coating compositions with technological optimization such that an appropriate erosion resistance is achieved even at film thicknesses which are not excessive. Important factors in obtaining effective erosion resistance are known to include a closely matched balance between flexibility or elasticity of the coating, on the one hand, and the hardness of the coating, on the other. A pronounced behavior combining the toughness with elasticity is known to be very important in coatings for the purpose of high erosion resistance. A key aspect of the research in this technical area lies in the discovery of specific components and combinations of components in coating compositions that lead to the resultant coatings having the desired erosion resistance.

In view of the ever growing requirements imposed on the environmental profile of coating compositions, moreover, it is desirable that these compositions include a smallest possible fraction of organic solvents.

International patent application WO 2010/122157 discloses erosion-resistant polyurethane coatings which are produced using coating compositions that comprise aliphatic polyester polyols such as polycarbonate diols and an isocyanate component, as for example a polylactone-modified isocyanate prepolymer or uretdione compounds. The compositions may comprise organic solvents, though in that case the amount of these solvents is specifically to be made comparatively low.

WO 2012/032113 A1 discloses two-component erosion-controlled coating compositions based on a polyol component and on a polylactone component terminated with isocyanate groups, it being possible for these compositions to be used for producing coatings on rotor blades. These compositions as well preferably include only very low levels of organic solvents.

One drawback of such very low-solvent systems is their comparatively limited compatibility with pigments, fillers and/or additives. While the systems can be formulated with an acceptably low viscosity, in other words a viscosity which allows application to a substrate, a precise judgment must be exercised when formulating in order to ensure that there are no unwanted increases in viscosity and/or processes of separation, particularly in the course of storage. For example, the addition of inherently typical matting agents such as silica-based or silicate-based matting agents or else waxlike matting agent types can lead to unwanted effects, since the systems are very sensitive in this respect. It is exactly these matting agents, however, which are very important in the context of the coating of wind turbines, especially in the offshore segment. Without such matting agents, indeed, the coatings generally fail to meet the statutory stipulations concerning mattness. The reasons why this is very important is that highly glossy and reflective surfaces constitute massive disrupting factors, particularly for the operation of air travel.

Current challenges in, for example, the construction of wind turbine rotor blades, especially for wind-rich locations (offshore), and also in aircraft construction (weight reduction with equal or improved performance), therefore lie in the provision of coating compositions which unite the advantages touted above and remove the drawbacks described. The compositions are to lead, firstly, to coatings featuring high erosion resistance. Secondly, however, it is also important that the coating compositions have a good environmental profile, in order to meet the ever-growing requirements in that respect. One parameter relevant in this context is the VOC ("volatile organic content"-fraction of volatile organic components), for example. A VOC of less than 250 g/l coating composition is presently considered a figure to be targeted. At the same time, however, the coating compositions ought to feature outstanding freedom of formulation. This means that the compositions ought not to react too sensitively to additization, as is generally the case with low-solvent or even solvent-free compositions.

Problem

The problem addressed by the present invention was therefore that of eliminating the above-described drawbacks of the prior art. The aim was to provide coating compositions which can be used for producing erosion-resistant coatings which feature outstanding erosion resistance. At the same time the coating compositions ought to have a good environmental profile and ought nevertheless to feature acceptable freedom of formulation.

Solution

Found accordingly has been an aqueous two-component coating composition comprising
(1) an aqueous paint base component comprising
  (A) at least one aqueous dispersion of at least one polymeric resin and
  (B) at least one polycarbonate diol
and
(2) a hardener component comprising
  (C) at least one polyisocyanate-modified polyester having an isocyanate content of 4% to 15%.

The new aqueous two-component coating composition is subject matter of the present invention and is also referred to below as coating composition of the invention. Preferred embodiments will become apparent from the description hereinafter and from the dependent claims.

The present invention also provides a method for producing coatings using the coating composition of the invention, and a coating produced from the coating composition. The invention also provides the use of the coating composition for improving erosion resistance.

Provided successfully was an aqueous coating composition, in other words a composition with aqueous character, comprising primarily water as solvent. Although such a coating composition therefore has an entirely different character from the solvent-free compositions described above, the coatings obtained feature excellent erosion resistance. The combination of a polycarbonate diol (B) and of the specific component (C) comprising polyisocyanate groups in an aqueous composition unites effective erosion resistance with a good environmental profile. The coating composition and the coatings are therefore ideally suited to substrates exposed to severe erosive influences, examples being wind turbine rotor blades or substrates in aircraft construction.

DESCRIPTION OF THE INVENTION

The coating composition of the invention is a two-component coating composition. This means, as is known, that for the purposes of the present invention, component (1) as described below (paint base component), and component (2) as described below (hardener component), are prepared and stored separately from one another and are not combined until shortly before application. The processing time or pot life (in other words, the time within which the coating composition of the invention can be processed at room temperature (15 to 25° C., more particularly 20° C.) without the increase in viscosity, as a result of corresponding crosslinking reactions at room temperature, for example, being so severe that application is no longer possible) is dependent, as is known, on the constituents employed, as for example on the polycarbonate diols (B) described later on below, and on the polyisocyanate-modified linear polyester (C). More particularly, however, the processing time of the coating composition is at least 2 min up to 60 min, preferably at least 5 min up to 60 min. The principal advantage of a two-component coating composition of this kind is that easy processing is possible—in particular, high curing temperatures are not needed—even in the case of large components such as rotor blades of wind turbines or aircraft. Following application to a substrate, the coating material of the invention is cured preferably at less than 80° C., especially preferably less than 60° C.

By curing is meant the process known to the skilled person, in other words the conversion of a coating composition, applied as a film to a substrate, into the ready-to-use state, in other words, therefore, into a state in which the substrate provided with the coating in question can be transported, stored, and put to its intended use. This curing is accomplished more particularly by chemical reaction of reactive functional groups in the components present, which are present as binder constituents in the coating material. Particularly noteworthy, therefore, in the context of the present invention is the reaction of the hydroxyl groups of the polycarbonate and optionally of further hydroxy-functional polymeric resins included as binders in the paint base component, more particularly resins in the at least one aqueous dispersion (A), with the isocyanate groups of the polyisocyanate-modified polyester (C). As a result of these crosslinking reactions and of the parallel evaporation of any organic solvents and/or water present, a coating film is formed—that is, a cured coating layer (cured coating) is produced. Activation of the reactions is possible by means of thermal energy, although in the present case there is the above-described advantage of high temperatures not being necessary.

The term "binder" or "binder constituent" refers herein, in accordance with the relevant DIN EN ISO 4618, to the nonvolatile fraction of a coating material, excluding pigments and fillers. Specific binder constituents are therefore in this sense, as well as the resins in the dispersion (A) and the component (B), component (C) as well (which may also be referred to as hardener, curing agent or crosslinking agent), or else further polymeric resins and/or additives, typical of coating materials, in other words all further nonvolatile constituents, apart from the pigments and fillers. For reasons not least of clarity, however, the term "binder" is used principally in relation to those components of the paint base component (1) that are responsible for film formation—that is, for example, the components (A) and (B). The component (C) is identified primarily, correspondingly, as the hardener or else crosslinking agent.

The two-component coating composition comprises—in the paint base component (1)—at least one aqueous dispersion (A) of at least one polymeric resin. This means, therefore, that the aqueous dispersion is used as such as a component for preparing the coating composition. Preferred aqueous dispersions contain precisely one polymeric resin.

Aqueous dispersions of polymeric resins, also called aqueous polymer dispersions, are known. They are therefore disperse systems in which water is present as a continuous phase (dispersion medium) and the polymeric resin is present as a phase dispersed in the continuous phase (disperse phase). The polymeric resins must, as is known, have certain physicochemical properties, which the skilled person can determine in a manner with which he or she is familiar, in order to be able to form an aqueous dispersion of this kind, in other words in order to be able to be stabilized in the hydrophilic continuous phase, and not to precipitate in the form of insoluble agglomerates.

For the hydrophilic stabilization and/or for the generation of dispersibility in an aqueous medium, a polymeric resin may comprise, for example, certain ionic groups and/or groups which can be converted into ionic groups (potentially ionic groups). Such resins are referred to in the context of the present invention as ionically hydrophilically stabilized resins. Nonionic hydrophilically modifying groups may likewise be present. In the context of the present invention, however, the ionically hydrophilically stabilized resins are preferred.

More specifically, the modifying groups are, for example, alternatively functional groups which can be converted by neutralizing agents and/or quaternizing agents into cations, and/or cationic groups (cationic modification)

or functional groups which can be converted by neutralizing agents into anions, and/or anionic groups (anionic modification) or nonionic hydrophilic groups (nonionic modification)

or combinations of the aforementioned groups.

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted by neutralizing agents and/or quaternizing agents into cationic groups). Additionally to be mentioned are the cationic groups prepared from the aforementioned functional groups using neutralizing agents and/or quaternizing agents that are known to the skilled person, such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic, sulfonic and/or phosphonic acid groups, more particularly carboxylic acid groups (functional groups which can be converted by neutralizing agents into anionic groups), and also anionic groups prepared from the aforementioned functional groups using neutralizing agents known to the skilled person, such as carboxylate, sulfonate and/or phosphonate groups.

Typical neutralizing agents for obtaining cationic groups include acids such as formic, acetic, and lactic acid. Examples of typical neutralizing agents for obtaining anionic groups are volatile bases such as ammonia or amines such as amines optionally having hydroxyl groups and having 1 to 12 carbon atoms, examples being triethanolamine and dimethylethanolamine.

The functional groups for nonionic hydrophilic modification are preferably poly(oxyalkylene) groups, more particularly poly(oxyethylene) groups.

The ionically hydrophilic modifications can be introduced into the resin by way of monomers which contain the ionic or potentially ionic groups. The nonionic modifications are introduced, for example, through the incorporation of poly(ethylene) oxide polymers as lateral or terminal groups of the resin molecules.

Further polar functional groups, hydroxyl groups for example, in the resin also, of course, support its dispersibility in water. Such functional groups are in general introduced into the resins likewise via corresponding monomers which contain these groups.

It is known likewise to be possible to achieve or improve the stabilization of polymeric resins in aqueous dispersion through the addition of dispersants, in other words typical surface-active additives (also referred to as surfactants, protective colloids, and emulsifiers). A combination of suitable emulsifiers and protective colloids is found, for example, in Houben Weyl, Methoden der organischen Chemie, volume XIV/1 Makromolekulare Stoffe, Georg Thieme Verlag, Stuttgart 1961, p. 411 ff. The proportional addition of organic solvents is a further possibility.

Aqueous dispersions of polymeric resins may take the form of primary dispersions, where the resins are prepared directly in the aqueous phase. Relevant processes are those of emulsion polymerization or else of suspension polymerization. Likewise possible are secondary dispersions. In that case, the polymeric resin is prepared in at least one organic solvent and is then transferred into the aqueous phase by continuous addition of water and simultaneous or subsequent removal of the organic solvents (temperature increase and/or pressure reduction).

The above observations are merely a supplementary fundamental elucidation. The precise way in which a specific aqueous dispersion can be produced, and which polymeric resins are contemplated for that purpose, are something which the skilled person knows or can find out through a few goal-oriented experiments.

Polymeric resins used in the at least one aqueous dispersion may be all resins known in this respect, provided they can be used to prepare an aqueous dispersion in the manner described above and known per se. Accordingly, corresponding (co)polymers of ethylenically unsaturated monomers, or polyaddition resins and/or polycondensation resins, can be used. Examples include polyacrylate, polyester, alkyd, polyurethane, polylactone, polycarbonate, polyether and epoxy resins, and also copolymers of the stated resins, as for example polyester-polyurethane resins or polyester-polyacrylate resins.

The coating composition of the invention preferably comprises at least one aqueous dispersion which comprises a hydroxy-functional polymeric resin. With very particular preference it comprises at least one aqueous dispersion which comprises a hydroxy- and carboxy-functional resin. With precisely such resins, as is known, aqueous dispersions can be prepared very effectively, since the stated groups give them a balanced polarity profile which allows them to be converted into an aqueous dispersion, possibly with assistance from the stated auxiliaries such as neutralizing agents and/or emulsifiers.

The stated hydroxy-functional resins preferably possess an OH number of 60 to 250 mg KOH/g, more preferably 80 to 200 mg KOH/g, and more particularly 90 to 180 mg KOH/g. The OH number for the purposes of the present invention is measured in accordance with DIN 53240. Any reference in the present invention to an official standard is of course to the version of that standard valid on the filing date or, if there is no valid version at that point in time, to the last valid version.

Preference is given to using at least one aqueous dispersion (A) which comprises at least one carboxy-functional polymeric resin. With more particular preference the stated resins have an acid number of 5 to 50 mg KOH/g, preferably 5 to 25 mg KOH/g. The acid number for the purposes of the present invention is measured in accordance with DIN EN ISO 3682.

The coating composition of the invention preferably comprises at least one aqueous dispersion (A) which comprises a polyacrylate resin as polymeric resin. Polyacrylate resins or else poly(meth)acrylate resins are, as is known, polymeric organic compounds which comprise different acrylate and/or methacrylate monomers, in other words contain such monomers in their reacted form. The term "(meth)acrylate" refers in the context of the present invention to acrylates and/or methacrylates and/or to compounds which include or are constructed from acrylates and/or methacrylates. Examples of such acrylate and methacrylate monomers include various alkyl (meth)acrylates and cycloalkyl (meth)-acrylates, such as, for example, the following compounds known to the skilled person: ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates such as cyclopentyl acrylate, cyclopentyl methacrylate, isobornyl acrylate, isobornyl methacrylate, cyclohexyl acrylate, and cyclohexyl methacrylate.

As stated above, the polymeric resins, thus more particularly the polyacrylate resins, are preferably hydroxy-functional. Incorporated preferably into the polymer framework, accordingly, are defined fractions of such acrylate and methacrylate monomers which have OH groups and therefore provide the polyacrylate resins with their OH functionality. Hydroxyl-containing monomer units used for preparing the polyacrylate resins are hydroxyalkyl (meth)acrylates, such as, for example, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and also, in particular, 4-hydroxybutyl acrylate and/or 4-hydroxybutyl methacrylate.

Other monomer units which can be used for the polyacrylate resins are vinylaromatic hydrocarbons, such as vinyltoluene, alpha-methylstyrene or, in particular, styrene, amides or nitriles of acrylic or methacrylic acid, vinyl esters or vinyl ethers, and also, in particular, acrylic and/or methacrylic acid. Latter monomers may serve in particular for the introduction of carboxylic acid groups and hence for increasing the acid number—in other words, ultimately, the dispersibility in water as described above, as well.

Polyacrylate resins of these kinds may be prepared in a conventional way, by means, for example, of the methods, customary and known within the polymers field, of continuous or discontinuous radically initiated copolymerization in bulk, solution, emulsion, miniemulsion, or microemulsion, under atmospheric or superatmospheric pressure, in stirred tanks, autoclaves, tube reactors, loop reactors, or Taylor reactors, at temperatures of 50 to 200° C., for example.

The at least one dispersion (A) of the at least one polymeric resin is aqueous. The expression "aqueous" is known to the skilled person in this context. It refers fundamentally to a system wherein the solvent does not exclusively comprise organic solvents, but instead, conversely, includes a significant fraction of water.

For the purposes of the present invention, "aqueous" is to be interpreted preferably to mean that the system in question comprises at least 10 wt % of water, preferably a least 15 wt %, more preferably at least 20 wt % of water, based on the total weight of the system. With particular preference, aqueous is to be interpreted such that in addition to the stated requirement for "at least 10 wt % (or at least 15 or 20 wt %) of water, based on the total weight of the system", the following provision is met: accordingly, moreover, the fraction of water, based on the total amount of the solvents present in the system (i.e., water and organic solvents), is at least 55 wt %, preferably at least 60 wt %, especially preferably at least 65 wt %. It is preferred, moreover, for the fraction of organic solvents in the system to be less than 20 wt %, preferably less than 15 wt %, based in each case on the total amount of the system. The system in the sense specified above is deemed, for example, to comprise the aqueous dispersion (A), the paint base component (1), or else the coating composition of the invention.

The at least one aqueous dispersion (A) very preferably meets the stipulation that, based on its overall weight, it comprises at least 35 wt % of water, that the fraction of water, based on the total amount of the solvents present in the dispersion (i.e., water and organic solvents) is at least 70 wt % and the fraction of organic solvents, based on their total weight, is less than 15 wt %. With very particular preference, therefore, the dispersion (A) includes a particularly high fraction of water.

The solids content of the at least one dispersion (A) is preferably between 15% and 80%, more particularly 20% to 70%, very preferably between 30% to 50%. The at least one dispersion (A) is used in this form in the coating composition of the invention.

For the purposes of the present invention, the nonvolatile fractions (NVC (nonvolatiles content), solids (content)) is determined by selecting conditions that are constant in each case, unless otherwise indicated. For the determination of the nonvolatile fraction in accordance with DIN EN ISO 3251, a quantity of 1 g of the constituent in question, such as a dispersion of a polymeric resin in corresponding solvents, is heated at 125° C. for 1 hour, and then cooled to 20° C., after which the residual amount is weighed.

The fraction of the at least one dispersion (A), based on the total weight of the coating composition of the invention, may vary widely and is dependent, for example, on the level of the solids content in the dispersion. Another influencing variable is whether the paint base component includes further polymeric resins as well as the polymeric resins which enter the composition through the one or more aqueous dispersions (A) of polymeric resins, and also as well as the at least one polycarbonate diol, such further polymeric resins being present as binder constituents in the composition and therefore contributing to film formation on curing.

Based on its total weight, the coating composition comprises preferably between 10 and 30 wt %, more preferably 12 to 25 wt %, more particularly 15 to 20 wt % of polymeric resins, preferably polyacrylate resins, which come from aqueous dispersions (A). Depending on the choice of the solids content of the aqueous dispersions, therefore, the fraction of these dispersions (A) as well is variable. The fraction of aqueous dispersions (A) is preferably between 25 and 65 wt %, preferably 30 and 60 wt %. It is possible here to use precisely one aqueous dispersion (A). Or else, for example, two different aqueous dispersions are used, containing two different polymeric resins. In that case the total amount of the dispersions (A) and of the polymeric resins they contain is preferably again within the ranges specified above.

The two-component coating composition comprises at least one polycarbonate diol (B), in the paint base component (1).

Considered formally, polycarbonate diols are esterification products which may form through reaction of carbonic acid with polyols. In actual practice, as is known, the carbonate structures are introduced by means of phosgene or carbonic diesters under common reaction conditions. The reaction with diols, as for example with 3-methyl-1,5-pentanediol, 1,6-hexanediol and/or 1,5-pentanediol, then gives the polycarbonate diols. Besides the carbonate functions joining the starting components, of course, such polycarbonate diols may also, proportionally, include further functional groups such as ester groups or ether groups, depending on the nature and amount of the starting compounds used. The polycarbonate diol is preferably a linear polycarbonate diol. The hydroxyl groups are preferably terminal, in other words are arranged at both chain ends of the preferably linear polycarbonate diol (hydroxyl-terminated polycarbonate diol). Very preferably the compound is an aliphatic polycarbonate diol, especially an aliphatic-saturated polycarbonate diol. The polycarbonate diol therefore preferably contains no aromatic groups, since these groups have a significantly restricted UV resistance.

The polycarbonate diols (B), more particularly the linear, aliphatic polycarbonate diols, preferably posses an OH number of 30 to 500 mg KOH/g, preferably 100 to 400 mg KOH/g, more particularly 150 to 300 mg KOH/g.

Since the polycarbonates (B) are diolic components, the OH number and the number-average molecular weight of the components are dependent on one another, and the stated OH number provides information on the number-average molecular weight. A high number-average molecular weight tends to be associated with a fairly low OH number. The number-average molecular weight may vary widely and is situated in the range of, for example, 220 g/mol to 2250 g/mol (in the context of the present invention, the average (number- and weight-average) molecular weights are measured by means of GPC analysis with THF (+0.1% acetic acid) as eluent (1 ml/min) on a styrene-divinylbenzene column combination, calibration with polystyrene standards). The number-average molecular weight is preferably between 375 and 750 g/mol.

Suitable polycarbonate diols (B) are available, for example, within the Desmophen® C product line from Bayer MaterialScience AG (Leverkusen, Germany) or Eternacoll® PH (UBE).

The fraction of the polycarbonates (B) is situated preferably in the range from 2 to 20 wt %, more preferably 3 to 15 wt %, very preferably 4 to 10 wt %, based in each case on the total weight of the coating composition of the invention.

The two-component coating composition comprises—in the hardener component (2)—at least one polyisocyanate-modified polyester (C) having an isocyanate content of 4% to 15%.

Polyesters are known. They are polymeric resins prepared by reaction of polyhydric organic polyols and polybasic organic carboxylic acids. The polyols and polycarboxylic acids here are linked with one another by esterification, in other words, therefore, by condensation reactions. Depending on the nature and functionality of the starting components and on the fractions and proportions in which they are used, linear or branched products, for example, are obtained. While linear products form primarily when using difunctional starting components (diols, dicarboxylic acids), branching is achieved, for example, through the use of alcohols of higher functionality (with an OH functionality—that is, number of OH groups per molecule—of more than 2). During the preparation, of course, the proportional use of monofunctional components, such as monocarboxylic acids, is also possible. It is also possible, for the preparation of polyesters, as is known, to use the anhydrides of carboxylic acids, especially the anhydrides of dicarboxylic acids, in addition to or in place of the corresponding organic carboxylic acids. Likewise possible is preparation through the use of hydroxycarboxylic acids or of the lactones derived from the hydroxycarboxylic acids by intramolecular esterification.

The polyester to be modified is preferably a polylactone polymer, in other words, therefore, a polymer prepared in general by ring-opening polymerization of lactones such as epsilon-caprolactone more particularly. This preparation generally employs organic alcohols, usually diols, as starters and/or catalysts. Where diols are used, the resulting polylactone polymer then possesses two terminal hydroxyl groups. In any case, however, the polymer possesses one hydroxyl group, formed by the last ring-opening. Such polyesters are therefore linear-aliphatic and saturated polyesters with at least one hydroxyl group. Suitable lactones for preparing the polylactone polymer are oxiran-2-one, beta-propiolactone, gamma-butyrolactone, gamma-valerolactone, epsilon-caprolactone, or methyl-epsilon-caprolactone, preferably gamma-butyrolactone and epsilon-caprolactone, more preferably epsilon-caprolactone. Suitable starter alcohols are neopentyl glycol, ethylene glycol, or trimethylolpropane.

The polyester to be modified, accordingly, is preferably a linear-aliphatic, hydroxyl-containing polyester, among such preferably a saturated polyester. With very particular preference the polyester to be modified is a polycaprolactone polymer.

The polyester, more particularly the linear-aliphatic and saturated polyester with at least one hydroxyl group, more preferably the polycaprolactone polymer, is polyisocyanate-modified and has an isocyanate content of 4% to 15%.

This means that the polyester as described above is modified with a polyisocyanate, in other words reacted with formation of covalent bonds, but with at any rate free isocyanate groups remaining intact after the reaction. A diisocyanate in particular is used preferably for the modification. Evidently, then, the polyester must include functional groups that are reactive with isocyanate groups, examples being hydroxyl groups or amino groups. It follows from what has been said above that these groups are preferably hydroxyl groups. After the reaction, then, the polyisocyanate is linked with the polyester via a urethane group. The corresponding reactions and reaction conditions are fundamentally known.

As polyisocyanates to be used for the modification it is possible to employ the compounds known per se such as aliphatic and aromatic polyisocyanates, especially diisocyanates, and their dimers and trimers, such as uretdiones and isocyanurates. Reference may be made, for example, to hexamethylene diisocyanate, octamethylene diisocyanate, decamethylene diisocyanate, dodecamethylene diisocyanate, tetradecamethylene diisocyanate, trimethylhexane diisocyanate, tetramethyl-hexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)-cyclohexane, 1,4- or 1,3- or 1,2-diisocyanatocyclohexane, and 2,4- or 2,6-diisocyanato-1-methylcyclohexane, diisocyanates or mixtures of these polyisocyanates, and also to the conventional dimers and/or trimers of the stated polyisocyanates, in other words, for example, uretdiones and isocyanurates of the abovementioned polyisocyanates. Preference is given to using aliphatic polyisocyanates, more particularly aliphatic diisocyanates. It is preferred in particular not to use any aromatic polyisocyanates. One particularly preferred polyisocyanate is hexamethylene diisocyanate (HDI).

The polyisocyanate-modified polyester possesses an isocyanate content of 4% to 15%, preferably 5% to 12%, especially preferably 6% to 10%. For the purposes of the present invention, the isocyanate content is determined in accordance with DIN EN ISO 11909 by reacting the respective sample with excess dibutylamine and back-titrating the excess with hydrochloric acid against bromophenol blue.

The weight-average molecular weight of component (C) is situated, for example, in the range from 500 to 10 000 g/mol, such as, more particularly, 1000 to 4000 g/mol. Corresponding products are available commercially, in solvent-free form or as a solution in conventional solvents as described later on below, for example, and can be readily used in the hardener component of the coating composition of the invention. Reference may be made, for example, to products of the commercial designation Desmodur (from Bayer) or Adiprene LFH (from Chemtura).

The fraction of the at least one polyisocyanate-modified polyester (C) is preferably in the range from 5 to 25 wt %, more preferably 6 to 20 wt %, very preferably 7 to 15 wt %, based in each case on the total weight of the coating composition of the invention.

The coating composition of the invention is aqueous and therefore comprises at any rate water (regarding the definition of aqueous, see above). The coating composition accordingly comprises preferably at least 10 wt % of water, preferably at least 15 wt % of water, very preferably at least 20 wt % of water, based in each case on the total weight. Preferred among these are the ranges 10 to 40 wt %, preferably 15 to 35 wt %, more particularly 20 to 30 wt %.

As further constituents, the coating composition of the invention may comprise various coatings components known to the skilled person in the art.

Although it is aqueous, the coating composition may include organic solvents. Organic solvents are known to the skilled person. Examples include aliphatic and/or aromatic hydrocarbons such as toluene, xylene, solvent naphtha, Solvesso 100, or Hydrosol® (from ARAL), ketones, such as acetone, methyl ethyl ketone, or methyl amyl ketone, esters, such as ethyl acetate, butyl acetate, butyl glycol acetate, pentyl acetate, methoxypropyl acetate, or ethyl ethoxypropionate, ethers, alcohols, chlorinated hydrocarbons, or mixtures of the aforesaid solvents. On account of the aqueous character of the composition of the invention, however, there are of course limits on the fraction of the organic solvent (regarding the definition, see above).

The coating composition accordingly comprises preferably less than 20 wt % of organic solvents, preferably less than 15 wt % of organic solvents, based in each case on the total weight. Preferred among these are the ranges 5 to less than 20 wt %, more particularly 5 to less than 15 wt %.

Further to the at least one polyisocyanate-modified polyester (C) with an isocyanate content of 4% to 15%, the coating composition of the invention may further comprise at least one further component which is different therefrom and comprises polyisocyanate groups. It is preferred, however, that component (C) is used in a fraction of at least 30 wt %, especially preferably 40 to 70 wt %, based on the total amount of the components present in the coating composition and comprising polyisocyanate groups.

Further components comprising polyisocyanate groups that may be used are the polyisocyanates which are known per se, such as aliphatic and aromatic polyisocyanates, more particularly diisocyanates and their dimers and trimers such as uretdiones and isocyanurates. Reference may be made, by way of example, to hexamethylene diisocyanate, octamethylene diisocyanate, decamethylene diisocyanate, dodecamethylene diisocyanate, tetradecamethylene diisocyanate, trimethylhexane diisocyanate, tetramethyl-hexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis (isocyanatomethyl)-cyclohexane, 1,4- or 1,3- or 1,2-diisocyanatocyclohexane, and 2,4- or 2,6-diisocyanato-1-methylcyclohexane, diisocyanates or mixtures of these polyisocyanates. Preference is given here to using the conventional dimers and/or trimers of the stated polyisocyanates, in other words, therefore more particularly, the uretdiones and isocyanurates—known per se and also available commercially—of the aforementioned polyisocyanates. Aliphatic polyisocyanates are used with preference. Especially preferred is the use of aliphatic polyisocyanates. Preferred further polyisocyanates are hexamethylene diisocyanate and isophorone diisocyanate and also mixtures thereof, more particularly their various trimers and dimers such as isocyanurates and uretdiones. The isocyanate groups in these components may be free or may have been blocked using known blocking agents. The isocyanate groups are preferably nonblocked (i.e., free). This is also true, moreover, of the above-described component (C) essential to the invention. The coating composition therefore preferably comprises exclusively components that comprise polyisocyanate groups and are nonblocked, these components being used preferably exclusively in the hardener component. The stated polyisocyanates are available commercially. Where present, the further polyisocyanates are of course used preferably in the hardener component. A compound is termed a polyisocyanate when it contains on average more than one isocyanate group per molecule.

Lastly, the coating materials compositions of the invention may also further comprise other constituents different from the components already described. These constituents include, for example, typical coatings additives such as catalysts, antioxidants, deaerating agents, wetting agents, dispersants, flow control agents, and defoamers, as for example polysiloxane-based defoamers, adhesion promoters, as for example silane-based adhesion promoters, rheological assistants such as thickeners, antisag agents, and thixotropic agents, waxes and waxlike compounds, biocides, matting agents, radical scavengers, light stabilizers, preferably UV absorbers with an absorption maximum below 370 nm and/or sterically hindered amines (HALS), corrosion inhibitors, flame retardants, or polymerization inhibitors, and also soluble dyes, pigments, and further fillers or catalysts. The fraction of such constituents is within the ranges common for them, of 0.1 to 30 wt %, for example, based on the total amount of the coating composition. It is preferred, for example, for the composition to comprise between 5 and 30 wt % of a pigment, more particularly of a color pigment such as titanium dioxide, for example.

The solids content of the coating compositions may vary according to the requirements of the case in hand. Preferably, though, the solids content of the coating composition of the invention is not less than 40%, more preferably 45% to 80%, and very preferably 50% to 75%. The method by which the solids content is determined is indicated earlier on above. Unless otherwise indicated, this test method is likewise employed in order to specify or obtain a preliminary determination of, for example, the fraction of various components or constituents of the coating composition, such as a polymeric resin of an aqueous dispersion (A), for example, as a proportion of the total weight of the composition. It is possible, therefore, to determine the solids content of a dispersion of a component that is to be added to the composition. By taking account of the solids content of the dispersion and the amount of the dispersion used in the composition, it is then possible to determine or specify the fraction of the component as a proportion of the overall composition. This determination method may of course also take place if, for example, a constituent has been acquired commercially and is identified by the seller as being solvent-free or water-free. In this case, the solids content of the commercial product for use will amount, for example, to approximately 100%.

The advantage of the present invention is based not inconsiderably on the following principle. The use of at least one aqueous dispersion (A) of a polymeric resin allows, surprisingly, the conversion of the hydrophobic polycarbonate diol, which on account of corresponding incompatabilities is not created per se for aqueous systems, into an aqueous system. Without wishing to be attached to any particular theory, it is assumed that the aqueous dispersion (A) and/or the polymeric resin contained therein acts as an emulsifier or vehicle for the polycarbonate diol, thereby allowing preparation of a stable aqueous paint base component. The use of a polycarbonate diol in an aqueous phase, this diol then being combined with at least one polyisocyanate-modified polyester (C), results in a coating composition which unites a very good environmental profile with outstanding erosion resistance.

With preference the preparation of the paint base component encompasses the following steps. First of all, an aqueous dispersion (A) is introduced or provided. The aqueous dispersion may comprise conventional dispersants, in other words, for example, typical surface-active additives (emulsifiers), and/or (further) dispersants may be added to the dispersion. Small amounts of organic solvents as well may be added, in order to support the emulsification that then follows. It is also possible for the dispersion to be admixed with other typical additives such as defoamers, for example.

This is followed by emulsification of the polycarbonate diol in the aqueous dispersion (A). The procedure for such emulsification, specifically, is known or can be determined where appropriate by means of simple, goal-oriented experiments (see also Examples). Generally speaking, emulsification is accomplished by introduction of energy into a mixed system, thereby reducing the size of the droplets in the two phases (here, the aqueous dispersion and the polycarbonate diol) and so successively increasing the size of the interface between the two phases. Overcoming the interfacial tension and creating an increased interface require energy. This energy is generally introduced mechanically, more particularly by way of shearing forces. These shearing forces are generally introduced by the stirring of the system, such as in typical stirring assemblies such as a dissolver, for example. In the emulsification, the polycarbonate diol is introduced, preferably continuously, into the stirred aqueous dispersion. Emulsification is typically effected when stirring speed and feed rate of the polycarbonate diol are adapted in such a way that there is not even any temporary macroscopic phase separation, with, instead, exclusively microscopic phase separation (emulsion) being present within the system throughout the feed time. The terms macroscopic and microscopic stand here, evidently, for phase separation which is or is in fact not visible to the eye. Although a certain phase separation may occur on storage subsequent to the emulsification, the system can easily be restored to an emulsion by stirring. It is assumed that in addition to the typical dispersants (coatings additives), where added, an emulsifying effect is exerted by the polymeric resin present in the aqueous dispersion (A), whereby accomplishing the transfer of the polycarbonate diol (B) into the aqueous phase. Transfer of the polycarbonate diol into the aqueous phase means, in the context of the present invention, that a composition is obtained in which the polycarbonate diol is in emulsified form. Since typical polycarbonate diols are generally liquid under standard conditions, in other words standard pressure and room temperature (that is, 10 to 40° C.), the term "emulsification" is selected for clarity (the mixing of two inherently immiscible liquids). Fundamentally, however, it is of course immaterial whether the term selected is emulsification or dispersion (as a general term for the mixing of two inherently immiscible phases).

Subsequently, further components are added to the paint base component of the coating composition, examples being pigments and additives already specified above, or else further polymeric resins as binders, in the form of further aqueous dispersions (A), for example. This is done typically likewise by mixing using typical stirring assemblies such as dissolvers.

The initially introduced aqueous dispersion (A) into which the at least one polycarbonate diol (B) is emulsified is preferably a secondary dispersion. In this way, the emulsification of the polycarbonate diol into the aqueous paint base component is particularly successful.

Such secondary dispersions are known; as described earlier on above, their preparation involves first preparing the polymeric resin in organic solvents, before dispersing in water and the removal of the organic solvents take place. Within the aqueous secondary dispersion, of course, there may remain—proportionally—organic solvents. The solvents used when preparing the polymeric resin may be selected more particularly from solvents that are at least proportionally miscible with water, such as butyl glycol, butyl diglycol, methoxypropanols, isopropoxy-propanols, 1-butoxy-2-propanol, and n-propanol. The resultant solutions of polymeric resins in organic solvents have a solids content, for example, of 60% to 90%. Conversion into the aqueous phase then takes place in general by the simultaneous or successive admixing of the solution with water and neutralizing agents already specified earlier on above. Since the polymeric resins, as described above, preferably possess potentially anionic groups such as carboxylic acid groups, preferred neutralizing agents are ammonia and amines such as triethanolamine, dimethylethanolamine, trimethylamine, and triethylamine. In general, moreover, a significant fraction of the organic solvents are removed, by azeotropic distillation, for example. During the preparation, of course, dispersants as described above may also be added. In this way, stable aqueous dispersions are obtained that have solids contents as specified above. As is known, the polymeric resins in dispersions prepared accordingly usually have lower molecular weights, especially as compared with resins primary dispersions. For example, polymeric resins in the secondary dispersions have number-average molecular weights in the range from 5000 to 50 000 g/mol. The number-average molecular weights are determined, for the purposes of the present invention, by means of GPC analysis with THF (+0.1% acetic acid) as eluent (1 ml/min) on a styrene-divinylbenzene column combination. Calibration is performed using polystyrene standards.

A specially preferred aqueous dispersion (A) for the emulsification of the at least one polycarbonate diol is an aqueous secondary dispersion having a solids content of 30% to 50%, comprising a polyacrylate resin having an OH number of 90 to 250 mg KOH/g, preferably 140 to 200 mg KOH/g, and an acid number of 5 to 25 mg KOH/g.

Based on its overall weight, the coating composition of the invention preferably comprises between 3 and 15 wt %, more preferably 4 to 10 wt %, of polymeric resins, preferably polyacrylate resins, which come from aqueous secondary dispersions (A). The fraction of aqueous secondary dispersions (A), based on the total weight of the coating composition, is preferably between 5 and 30 wt %, preferably 5 to 20 wt %.

The coating composition of the invention preferably further comprises an aqueous primary dispersion (A). Such primary dispersions are also known; as described earlier on above, their preparation involves the polymeric resin being prepared directly in the aqueous phase, by means, for example, of relevant processes such as emulsion polymerization.

As is known, the polymeric resins in dispersions prepared accordingly usually have higher molecular weights, especially as compared with the resins in secondary dispersions. For example, the polymeric resins in the primary dispersions have number-average molecular weights, in the context of the present invention, of at least 60 000 g/mol, such as, more particularly, at least 100 000 g/mol, as for example in the range from 100 000 to 1 000 000 g/mol.

In the context of the present invention it has surprisingly emerged that through the use of a primary dispersion of this kind, even without the addition of conventional matting agents, it is possible to prepare a coating composition which exhibits an outstanding matting effect, which is very important, as described at the outset. In this way, in the preparation of the aqueous coating composition, a further-improved freedom of formulation is possessed. Indeed, given the fact that a matting effect is achieved simply through the use of the primary dispersion, comprising as binder a polymeric resin which is necessary in any case for film formation, it is possible to do without the use of separate matting agents.

One aqueous primary dispersion (A) which is especially preferred in the context of the present invention possesses a solids content of 30% to 50% and comprises a polyacrylate resin having an OH number of 60 to 150 mg KOH/g, preferably 80 to 130 mg KOH/g.

Based on its overall weight, the coating composition of the invention preferably comprises between 5 and 25 wt %, more preferably 10 to 20 wt %, of polymeric resins, preferably polyacrylate resins, which come from aqueous primary dispersions (A). The fraction of aqueous primary dispersions (A), based on the total weight of the coating composition of the invention, is preferably between 15 and 50 wt %, preferably 20 to 45 wt %.

The ratio of the total molar amount of hydroxyl groups in the paint base component to the molar amount of isocyanate groups in the hardener component is preferably from 1.1:1.0 to 1.0:1.5, more preferably 1.0:1.0 to 1.0:1.5. With particular preference, accordingly, the ratio of the total molar amount of hydroxyl groups in components (A) and (B) of the paint base component to the molar amount of isocyanate groups in the hardener component occupies the stated value.

All stated preferred embodiments are taken per se and may be considered as preferred in combination with all other preferred configurations. The preferred embodiments apply not only for the coating composition of the invention, but also for the subjects described subsequently, as for example a process in which the coating composition is employed.

The present invention also relates to a method for producing the coating composition of the invention. It can be produced using the customary and known mixing methods and mixing assemblies such as stirred tanks, agitator mills, extruders, or compounders. In this context it should be borne in mind that the coating composition of the invention is a two-component composition and that the paint base component and the hardener component are prepared and stored separately from one another and then not combined and mixed until shortly before the application of the primer, as described above. Besides the constituents (A) and (B) that are essential to the invention, this paint base component generally comprises any adjuvants and/or coatings additives that may be present. This paint base component is then admixed with the hardener component, which in addition to the constituent (C) that is essential to the invention may also comprise further compounds comprising polyisocyanate groups, shortly before the coating composition is applied to a substrate. It should also be ensured, when preparing the coating composition, that the paint base component (1) is prepared preferably as described earlier on above—that is, the process of preparing the paint base component encompasses, in the order stated, (i) the provision of an aqueous dispersion (A), (ii) the emulsification of the polycarbonate diol (B) in the aqueous dispersion (A), and (iii) the addition of further components of the paint base component, such as, in particular, pigments or else further polymeric resins as binders, as for example a (further) aqueous primary dispersion of a polymeric resin, to the mixture obtained in (ii).

A further subject of the present invention relates to a coating produced from the coating composition of the invention, and also to a method for producing such coatings.

The method for producing a coating comprises the application of the coating composition to a substrate. Application may take place by the customary methods such as spraying (for example, airless, air mix, compressed air, hot spray methods or inductive mixing), roller coating, rolling, brushing, or by cartridge. The coating composition is preferably applied by rolling or brushing.

In order to produce a cured coating, the applied coating composition is cured following application. Curing preferably takes place thermally. In this case the applied coating composition or the coating consisting of the composition is exposed preferably to temperatures of not more than 80° C., preferably not more than 60° C. Particularly preferred is a temperature range from 15 to 60° C., very particularly from 15 to 50° C.

The period of time needed for complete curing may vary greatly according to the curing temperature selected, and is situated, for example, in the range from 30 minutes to 10 days. Curing may take place, for example, for a time of 30 minutes at 40° C. to 60° C., or else at only 15 to 25° C. for a time of 10 days. In the course of or prior to the curing, it is also possible to employ customary thermal curing devices and/or convection methods, examples being tunnel ovens, IR and NIR heat radiators, fans, and blowing tunnels. These devices may also be combined with one another. In that case, a temperature-controlled curing procedure may be assisted by convection.

The coatings may in each case have a dry film thickness of, for example, 50 to 500 μm, preferably from 100 to 400 μm.

The coatings of the invention can be produced on any desired substrates by application to the substrate of a coating composition of the invention. The substrates may be composed of any of a very wide variety of materials and combinations of materials. They consist preferably of metals such as steel or aluminum and also of plastics such as epoxy resin-based plastics, which may have been given glass fiber (GRP), aramid fiber (ARP) and/or carbon fiber (CRP) reinforcement or a natural fiber reinforcement with hemp or sisal, for example, and/or of glass. Preferred substrates are glass fiber-reinforced epoxy resin plastics. The substrates may have any desired shapes and sizes.

An advantage, however, is that very large substrates in particular, such as rotor blades, for example, can be coated without particular technical difficulties. The reason is that the coating composition of the invention can be cured at comparatively low temperatures, meaning that there is no need for explicit supply of heat, in other words thermal energy, as part of a complex equipment set-up, in order to produce a cured coating.

On account of the very good erosion resistance of the coatings, preferred substrates are those which are particularly severely subject to rain or sand erosion. Substrates contemplated may be rotor blades, air or land vehicles, ships, edifices, or pipelines. Preferred substrates are rotor blades of wind turbines, helicopters, or ship's screws, and also air vehicles such as airplanes, for example. Suitable substrates more particularly are rotor blades of wind turbines and airplanes. Another factor here, in particular, is the fact that the coatings may, moreover, exhibit a very good matting effect.

It follows from the above that a substrate coated with a coating of the invention is also provided by the present invention. It follows equally from the above that the use of the coating composition of the invention and also the use of a coating of the invention for improving the erosion resistance of substrates, more particularly of the substrates specified above, are also provided by the present invention. It likewise follows from the above that the use of a coating composition of the invention which comprises an aqueous primary dispersion (A) of a polymeric resin, preferably both a secondary dispersion and a primary dispersion (A), and also the use of a coating produced therefrom on substrates, for the purpose of matting substrate surfaces, are provided by the present invention.

It is also possible for a multicoat coating to be produced using a coating composition of the invention. A multicoat coating of this kind is also provided by the present invention. The coating produced from the coating composition is therefore present in a multicoat coating. Preferred multicoat coatings are those in which a coating of the invention constitutes the topcoat. In this way, one technical effect of the coating of the invention, namely the outstanding erosion resistance, is exploited to its optimum. This means that all of the further coating layers are disposed beneath the coating of the invention, and hence between the substrate and the coating of the invention. A substrate coated with a coating of the invention need not, therefore, be in direct contact with this coating. Disposed in between there may be further coats, an example being at least one surfacer coat known per se.

The coating composition of the invention is especially suitable for the coating of corners and edges, more particularly edges, of substrates. The use of the coating composition of the invention and also the use of a coating of the invention for improving edge protection is therefore also provided by the present invention. Straight edges of substrates, as for example of the substrates identified above, are particularly severely subject to erosive effects in service.

Although an aqueous coating composition of the invention has an entirely different character from the known compositions comprising organic solvents or from the known solvent-free compositions, coatings are obtained which exhibit excellent erosion resistance. Also, there is the high freedom of formulation that was elucidated already at the start.

The present invention is elucidated below by examples.

EXAMPLES

1. Test Methods 1.1 General Remarks

For the laboratory determination of erosion resistance it is in general possible to use a variety of equipment, with which either the coated substrate for erosion is moved through the erosion medium, or the substrate is fixed and the erosion medium flows around it. A stationary test specimen can be tested, for example, by a high-pressure water jet technique, which is used for water jet cutting, for example. The erosion effect is controlled by water pressure, by distance from the workpiece, and by the type and size of nozzles. The effect can be intensified further by the use of sand, corundum or silicon carbide at the same time. Also conceivable is sand-blasting or steam blasting, in which case the prevailing pressure, nozzle size, and distance from the workpiece may likewise be used to vary the erosion effect and adapt it to realistic conditions.

In the case of the rain erosion test for moving test specimens, the coated substrate for erosion is attached to a rotor or a disk and is moved, by means of the radial velocity generated, through a curtain of water droplets or mixtures with salt or sand. Currently the most common test scenario, which is used in the wind energy sector, for example, operates with velocities of 140 m/s and a rain volume of 30 l/h. In the airplane industry, velocities of up to 220 m/s are tested, with a comparable rain volume. The tests for rain erosion resistance may take place in accordance with the standard specification ASTM G 73. The constructions covered by this specification are individual and can be compared with one another using standards. Common to the stated testing possibilities is the simulation of realistic velocities, such as peripheral velocities of rotor blades or travel flight velocities of airplanes, for example, with the damage patterns being similar to the damage patterns that occur realistically.

The testing of the matting effect or of the degree of mattness may be carried out on coatings that have been produced, by measuring the gloss of the coating. A low gloss value then corresponds to a good degree of mattness. Typical gloss measurements may take place, for example, at the 60° angle in accordance with DIN EN 13523-2. Within the art, a gloss of less than 15 units at a 60° angle is typically designated matt.

1.2 Test Conditions

As part of the examples, the rain erosion resistance was tested in accordance with the standard specification ASTM G 73. The tests were carried out on an in-house rain erosion test set-up. The test specimens are spun at defined time intervals (15 minutes) and at defined velocity (140 m/s) through a curtain of droplets. The flow rate applied keeps the rain volume likewise constant (30 l/h). The droplet sizes of the applied "rain" are on average 5-6 mm. The tests take place at a temperature of 20 to 25° C. Evaluation is visual. The erosion resistance corresponds to the time taken for the substrate to first show through.

The degree of mattness or gloss is determined in accordance with DIN EN 13523-2. The determination is made using a MICRO TRI-GLOSS gloss meter from BYK-Gardner. Before each measurement, the instrument is calibrated with the installed calibration standards. For the test, the 60° angle setting is selected on the instrument. 5 measurements in longitudinal direction (drawdown direction or direction of application) are carried out, by placing the instrument planarly onto the surface and reading off the measurement value. From 5 measurement values, an average is calculated and is reported in the test protocol. Assessment is made by determining the gloss value (GU) between 0 and 100. Low gloss values correspond to a high matting effect.

2. Production of Coating Compositions and Cured Coatings

The paint base component and hardener component of aqueous coating compositions were prepared by combining the respective constituents in the order stated and progressively intimately mixing them in a dissolver (table 1). In the case of the coating compositions comprising a polycarbonate diol (B), the procedure adopted was as follows: first of all, the secondary dispersion (A) indicated in each case in table 1 was introduced, and commercial dispersing additives and also Butoxyl were added with stirring. Likewise added was a commercial defoamer, in order to prevent excessively intense development of foam in the course of the subsequent emulsification. Emulsification of the polycarbonate diol (B) in the aqueous dispersion (A) then follows. For this, the polycarbonate diol, based on a 25 kilogram batch of paint base material, was added continuously over the course of 10 minutes. During the addition, the system was uniformly stirred (dissolver, Disperlux 075 model, from Pendraulik, power 0.75 kW, dissolver disc diameter 12.50 cm, rpm (revolutions per minute) 1500). With this stirring speed, the process of emulsification was continuous, without macroscopic phase separation. After the end of the addition of the polycarbonate diol, first water and titanium dioxide were admixed, and then the formulation was completed as indicated in table 1.

TABLE 2

|  | C1 | C2 | C3 | I1 |
|---|---|---|---|---|
| Rain erosion test duration (in minutes) | 30 | 30 | 45 | 240 |
| Gloss | 80 | 12 | 24 | 10 |

The results show that the coatings produced using the new aqueous coating composition exhibit outstanding erosion resistance. The resistance, moreover, is much better than that of coatings produced using aqueous compositions which do not comprise the inventive combination of polycarbonate diol (B) and the compound (C) containing isocyanate groups.

A further comparison with coatings produced using compositions comprising organic solvents, and solvent-free compositions, shows that the coatings of the invention are in fact more resistant. Reference may be made, for example, to examples 1 and 2 of DE 10 2010 044 935 A1, which exhibit a rain erosion resistance of 180 minutes and 160 minutes, the prior art in fact having realized a substantially higher topcoat film thickness of 300 micrometers.

TABLE 1

| Constituent | Parts by weight | | | |
|---|---|---|---|---|
| Paint base component | C1 | C2 | C3 | I1 |
| Aqueous secondary dispersions of a polymeric resin (A) (solids content 41%, OH number 165, acid number 10) | 67.75 | 25.0 | 25.0 | 14.4 |
| Dispersing additives | 1.00 | 1.0 | 1.0 | 1.6 |
| Butoxyl |  |  |  | 1.2 |
| Defoamer | 1.0 | 1.0 | 1.0 | 0.5 |
| Linear aliphatic polycarbonate diol (B) with terminal hydroxyl groups, solvent-free | — | — | — | 6.8 |
| Water | 1.5 | 1.5 | 1.5 | 0.92 |
| Titanium dioxide pigment | 20.0 | 20.0 | 20.0 | 23.8 |
| Completion with |  |  |  |  |
| Water | 5.5 | 4.0 | 4.0 | 6.9 |
| Additive mixture | 2.5 | 5.5 | 5.5 | 4.1 |
| Butoxyl/Texanol | 1.25 | 2.0 | 2.0 | 3.3 |
| Aqueous primary dispersions of a polyacrylate resin (A), solids content 45%, OH number 105 | — | 40.0 | 40.0 | 36.5 |
| Total | 100 | 100 | 100 | 100 |
| Hardener component |  |  |  |  |
| Aliphatic, HDI-modified polyester (C) with an isocyanate content of 8.4% | — | — | 40.0 | 40.0 |
| HDI trimer | 80.0 | 80.0 | 48.0 | 48.0 |
| Butoxyl | 20.0 | 20.0 | 12.0 | 12.0 |
| Total | 100 | 100 | 100 | 100 |

C = Comparative composition
I = Inventive composition 3.25 parts of the paint base component were then mixed homogeneously with 1 part of the hardener component and this mixture was applied directly (brush application) to an epoxy resin test specimen already coated with a commercial, polyurea-based pore filler. Curing took place by storage over a period of seven days at 20 to 25° C. The dry film thickness was 120 micrometers.

The multicoat coatings disposed on the substrate were subsequently investigated for rain erosion resistance and degree of mattness (table 2).

At the same time it has been shown that the coating compositions of the invention, without the addition of separate matting agents, as a result of the use of a primary dispersion (A), lead to coatings which have a very high degree of mattness.

The coating compositions of the invention, accordingly, outstandingly unite important performance properties, these being good erosion resistance, with a high-grade environmental profile manifested through the aqueous character of the composition. At the same time, the degree of mattness can be achieved without the use of commercial matting agents. Simply the use of an aqueous primary dispersion (A) which comprises as binder a polymeric resin that is necessary in any case for film formation produces a matting effect, thereby removing the need to use separate matting agents. The freedom of formulation, which is improved in any case simply by the conditioning of the coating composition as an aqueous (and not solvent-free) composition, is increased further as a result.

The invention claimed is:

1. An aqueous two-component coating composition comprising
    (1) an aqueous paint base component comprising
        (A) at least one aqueous dispersion of at least one polymeric resin
        and
        (B) at least one polycarbonate diol
    and
    (2) a hardener component comprising
        (C) at least one polyisocyanate-modified polyester having an isocyanate content of 4% to 15%.

2. The aqueous two-component coating composition as claimed in claim 1, wherein the paint base component (1) comprises at least one aqueous dispersion (A) which comprises at least one hydroxy-functional polymeric resin.

3. The aqueous two-component coating composition as claimed in claim 2, wherein the hydroxy-functional polymeric resin is also carboxy-functional.

4. The aqueous two-component coating composition as claimed in claim 2, wherein the hydroxy-functional polymeric resin is a polyacrylate resin.

5. The aqueous two-component coating composition as claimed in claim 1, wherein the polyisocyanate-modified polyester (C) is a hexamethylene diisocyanate-modified polyester.

6. The aqueous two-component coating composition as claimed in claim 1, wherein the modified polyester (C) is obtained by reaction of hexamethylene diisocyanate with a hydroxy-functional aliphatic polyester.

7. The aqueous two-component coating composition as claimed in claim 6, wherein the hydroxy-functional aliphatic polyester is a polycaprolactone polymer.

8. The aqueous two-component coating composition as claimed in claim 1,
    wherein the hardener component (2) further comprises a component which is different from the polyester (C) and comprises polyisocyanate groups, and
    the fraction of the polyester (C) in the hardener component, based on the total amount of components present in the coating composition and comprising polyisocyanate groups, is from 40 to 70 wt %.

9. The aqueous two-component coating composition as claimed in claim 1, wherein the paint base component (1) comprises at least two aqueous dispersions (A), at least one dispersion (A) being a secondary dispersion and at least one dispersion (A) being a primary dispersion.

10. The aqueous two-component coating composition as claimed in claim 9, wherein the at least one secondary dispersion (A) and the at least one primary dispersion (A) comprise a hydroxy-functional polyacrylate resin as polymeric resin.

11. The aqueous two-component coating composition as claimed in claim 1, wherein the paint base component (1) is obtained by, in order:
    emulsifying a polycarbonate diol (B) in an aqueous dispersion (A), thereby obtaining a mixture, and
    adding further components of the paint base component to the mixture obtained in the emulsifying.

12. A method for producing a coating on a substrate, the method comprising
    applying a coating composition as claimed in claim 1 to a substrate, thereby obtaining an applied composition, and
    subsequently curing the applied composition.

13. A coating obtained by the method as claimed in claim 12.

14. A multicoat coating which comprises as topcoat the coating as claimed in claim 13.

15. A method of improving the erosion resistance of a substrate, the method comprising:
    producing a coating on a substrate in need thereof by the method of claim 12, thereby obtaining a coated substrate.

16. The method of claim 15, wherein the coated substrate has a rain erosion resistance greater than 180 minutes.

17. The method of claim 16, wherein the coated substrate has a gloss value of between 0 and 15.

18. The aqueous two-component coating composition of claim 1, having a volatile organic content of less than 250 g/l.

19. The aqueous two-component coating composition of claim 1, wherein the composition does not comprise a silica-based matting agent, a silicate-based matting agent, or matting agent.

20. The aqueous two-component coating composition of claim 1, wherein the composition does not comprise a matting agent.

* * * * *

UNITED STATES PATENT AND TRADEMARK OFFICE
CERTIFICATE OF CORRECTION

PATENT NO. : 10,093,825 B2
APPLICATION NO. : 15/306287
DATED : October 9, 2018
INVENTOR(S) : Juergen Muench Page 1 of 1

It is certified that error appears in the above-identified patent and that said Letters Patent is hereby corrected as shown below:

In the Claims

Column 22, Line 45 in Claim 19, please delete:
"or matting agent."
And replace it with:
--or a wax matting agent.--

Signed and Sealed this
First Day of January, 2019

Andrei Iancu
*Director of the United States Patent and Trademark Office*